(12) United States Patent
Mildner et al.

(10) Patent No.: US 9,805,873 B2
(45) Date of Patent: Oct. 31, 2017

(54) VACUUM VARIABLE CAPACITOR

(71) Applicant: COMET AG, Flamatt (CH)

(72) Inventors: Mark Joachim Mildner, Rizenbach (CH); Roland Bieri, Selzach (CH); Mike Abrecht, Thörishaus (CH); Walter Bigler, Heitenried (CH); Douglas Beuerman, Boulder Creek, CA (US); Jack Gilmore, Fort Collins, CO (US)

(73) Assignee: COMET AG, Flamatt (CH)

( * ) Notice: Subject to any disclaimer, the term of this patent is extended or adjusted under 35 U.S.C. 154(b) by 133 days.

(21) Appl. No.: 14/891,576

(22) PCT Filed: May 30, 2013

(86) PCT No.: PCT/EP2013/061174
§ 371 (c)(1),
(2) Date: Nov. 16, 2015

(87) PCT Pub. No.: WO2014/191041
PCT Pub. Date: Dec. 4, 2014

(65) Prior Publication Data
US 2016/0111218 A1    Apr. 21, 2016

(51) Int. Cl.
| | |
|---|---|
| *H01G 5/01* | (2006.01) |
| *H01G 5/013* | (2006.01) |
| *H01G 5/00* | (2006.01) |
| *H01G 7/00* | (2006.01) |
| *H01G 5/16* | (2006.01) |
| *H01G 5/04* | (2006.01) |
| *H01G 5/014* | (2006.01) |
| *H01G 5/14* | (2006.01) |
| *H01G 5/38* | (2006.01) |
| *H01G 5/011* | (2006.01) |

(52) U.S. Cl.
CPC ............ *H01G 5/013* (2013.01); *H01G 5/011* (2013.01); *H01G 5/014* (2013.01); *H01G 5/04* (2013.01); *H01G 5/145* (2013.01); *H01G 5/38* (2013.01); *H01G 2005/02* (2013.01)

(58) Field of Classification Search
CPC  H01G 4/02; H01G 4/255; H01G 5/14; H01G 5/0136; H01G 5/04; H01G 5/013; H01G 5/011
USPC ......................... 361/279, 278, 273, 290, 292
See application file for complete search history.

(56) References Cited

U.S. PATENT DOCUMENTS

| | | |
|---|---|---|
| 2002/0048136 A1 | 4/2002 | Nemoto et al. |
| 2010/0202094 A1 | 8/2010 | Jaggi et al. |
| 2013/0038978 A1 | 2/2013 | Takahashi et al. |

FOREIGN PATENT DOCUMENTS

| | | |
|---|---|---|
| GB | 1208393 A | 10/1970 |
| GB | 1574197 A | 9/1980 |

(Continued)

OTHER PUBLICATIONS

International Search Report (dated Apr. 3, 2014) for corresponding International App. PCT/EP2013/061174.

*Primary Examiner* — Eric Thomas
*Assistant Examiner* — Arun Ramaswamy
(74) *Attorney, Agent, or Firm* — WRB-IP LLP

(57) ABSTRACT

A vacuum variable capacitor includes a pre-vacuum enclosure for reducing a pressure differential across the bellows. The vacuum force load on the drive system can thereby be reduced, allowing faster movement of the movable electrode, faster capacitance adjustment of the vacuum variable capacitor and longer lifetimes of the device.

14 Claims, 4 Drawing Sheets

(56) References Cited

FOREIGN PATENT DOCUMENTS

| | | |
|---|---|---|
| JP | H1167590 A | 3/1999 |
| JP | 2010135439 A | 6/2010 |

VACUUM VARIABLE CAPACITOR

BACKGROUND AND SUMMARY

The present invention relates to the field of vacuum variable capacitors.

Vacuum variable capacitors are useful for example in impedance matching networks in which the impedance of a time-dependent high-frequency load can be matched with that of a generator by adjusting one or more vacuum variable capacitors. The capacitance of such capacitors can be controllably adjusted by moving one electrode, or set of electrodes, with respect to the other, and the use of vacuum as the dielectric medium allows their use in high power applications, for example operating at voltages in the kV range or several tens of kV voltages, carrying currents up to several hundred amps, and at frequencies as low as 200 kHz or as high as 200 MHz. Such capacitors can be used as the tuning element in high-power impedance matching networks and are often used for high power radio-frequency (RF) applications requiring fast, controllable, reliable capacitance adjustment over a large range (typically about 1:50 or more) with high resolution (typically more than 10000 setpoints in the range) and operating lifetimes of many years.

Vacuum capacitors typically comprise a pumped and sealed enclosure, said enclosure typically comprising two metallic collars electrically insulated form each other by a cylindrical (tubular) ceramic (or other electrically insulating) piece joined in a vacuum tight manner to the aforementioned collars. Inside the enclosure and conductively attached to each metallic collar are electrodes whose function (together with the dielectric) is to generate electric capacitance. Typically one electrode is mechanically fixed to one collar and the other electrode can be moved by means of a drive system comprising shaft and screw/nut system. Axial movement of the screw/nut guiding system outside the vacuum is transferred to axial movement of the movable electrode inside the vacuum typically by means of an expandable joint, hereafter generally referred to as a bellows, although other expandable joints may be used. The vacuum dielectric medium gives the name to such capacitors. The vacuum pressure is typically better (lower) than 10-4 mbar. Using vacuum as a capacitor dielectric has the advantages of stable dielectric value (in particular no temperature, nor frequency dependencies), and allows stable operations of the capacitor at high voltages and high currents with very low dielectrical losses. For example, Publication US2010202094 (A1) describes a vacuum variable capacitor. Some specific applications of vacuum capacitors include broadcasting (eg in an oscillation circuit of a high power transmitter) or plasma controlling processes in the semiconductor, solar and flat panel manufacture, for example during industrial Plasma-Enhanced Chemical Vapor Deposition (PECVD) processes. In such applications, adjusting the capacitance of the vacuum variable capacitors allows to change (and match) the impedance between RF loads (such as those generated by the PECVD processes) and the fixed impedance of a high power RF generator, fixed by industry standard to Z $$\text{out Generator} = (50 + 0j) \text{ Ohm}.$$

Vacuum capacitors are the key tunable element for RF power transfer to time-varying loads. Despite being relatively bulky, vacuum variable capacitors offer several advantages compared to other tuning mechanisms such as inductive tuning, or other forms of capacitive tuning (non-mechanical technology or non vacuum-technology). Indeed, vacuum variable capacitors allow nearly continuous tuning and have an excellent resolution (capacitance range can easily be divided into more than 10000 setpoints when the micro-step features of a typical stepper motor is used) over a very large capacitance range and have very high voltage capabilities thanks to the vacuum dielectric. Moreover, because of the extremely low dielectric losses, vacuum capacitors allow large currents without generating much heat and consequently are essentially unrivalled for the most demanding power applications. The adjustment of the capacitance value is achieved by mechanically moving one electrode with respect to the other electrode, thereby either modifying the distance between the two electrode surfaces or modifying the electrode surface overlap (the latter is most common), both of which result in a change of the capacitance value.

Typical vacuum variable capacitors for MHIz applications are designed to provide capacitance values in the pF range (sometimes extending into the low nF range), whereas a single unit will cover a capacitance range of approximately 1:50 or more; that is, if the minimum setting Cmin is for example 10 pF, then a maximum of Cmax=500 pF can typically be set using the same unit. The time taken to move the movable electrode between Cmin and Cmax is typically is or more in prior art capacitors. A smaller adjustment requires a proportionally smaller amount of time. Recently, the adjustment times during, and in between consecutive plasma processes used in chip manufacturing or other semiconductor manufacturing processes have shrunk considerably, so that vacuum variable capacitors have sometimes become the bottleneck element in impedance matching and in the overall processes using radio frequency power. While there is progress towards more rapid control software, there are physical limitations on the speed with which a mechanical part (the moving electrode) can be moved using a given motor. One limiting factor on the speed is the motor power required to counter the significant force due to the pressure differential (1 bar) between the inside and the outside of the vacuum tight enclosure.

State of the art vacuum variable capacitors are thus limited in speed primarily by the power of the motor and by the pressure-velocity limit (so-called PV value) of the screw and nut of the drive system used to move the movable electrode of the capacitor. A high PV value leads to a high contact pressure between the nut and the screw threads of the drive system, negatively affecting the wear of said screw/nut system and resulting in earlier failures (or alternatively requiring regular exchange of screw/nut system).

Prior art capacitors also suffer from significant membrane stresses and bending stresses in the bellows. The greater these stresses, the smaller the number of compression/expansion cycles (lifecycles) which the bellows can endure before they fail.

Irrespective of the type of motor being used for the drive system, a high torque is inevitably required to work against the pressure differential of a prior art vacuum variable capacitor, as explained below.

Stepper motors are typically used to drive vacuum variable capacitors because of their positioning accuracy (resolution), high stiffness (stepper motors develop their maximum holding torque at standstill and typically do not require any brake), and because they have satisfactory speeds for most applications. Typically stepper motors can run at 600 RPM or 1200 RPM to drive most common vacuum variable capacitors and still provide enough torque to work against the vacuum force. Unfortunately, however, one property of stepper motors is that increasing the speed decreases the available torque, which, at very high speeds, results in step loss and inaccuracy. Other motors (such as servo-motors, or linear motors) also have decreasing torque at high speeds. Obtaining a combination of higher torque and speed is only possible by drastically increasing the size and cost of the motor. This is not an acceptable option for components integrated into OEM (original equipment manufacturer) impedance matching networks.

It is desirable to overcome the above and other disadvantages with prior art vacuum variable capacitors. In particular, it is desirable to provide an improved vacuum variable capacitor in which the adjustment speed is increased, but preferably without increasing the size of the motor, without increasing the size of the device, and/or without reducing the adjustment resolution of the device.

Additional advantages may include an increase in the lifetime of the device (in particular an increase of the number of capacitance adjustment cycles), without compromising on the maximum operating voltage/power, compactness of the device, or its adjustment resolution.

According to an aspect of the present invention, a vacuum variable capacitor is provided, adjustable between a minimum capacitance value and a maximum capacitance value, and comprising:

a first vacuum enclosure containing capacitor electrodes separated by a vacuum dielectric, the wall of the first vacuum enclosure comprising a first deformable region (also referred to as bellows) for transferring mechanical movement between a drive means disposed outside the first vacuum enclosure and a mobile one of the capacitor electrodes inside the first vacuum enclosure; and a second enclosure, referred to as the pre-vacuum enclosure, containing a gas at a predetermined pressure, lower than atmospheric pressure, the pre-vacuum enclosure being arranged such that the first deformable region separates the pre-vacuum enclosure from the first vacuum enclosure.

The pre-vacuum enclosure (also referred to as a secondary vacuum enclosure) contains a gas at a pressure below atmospheric pressure, and thereby serves to reduce the pressure differential across the bellows. This reduction in pressure differential in turn reduces the amount of motor torque which is required to move the bellows and/or increases the adjustment speed which can be achieved using a given motor.

The presence of the pre-vacuum enclosure means that the motor needs less torque in order to drive the nut and compress or expand the bellows and move the movable electrode(s) inside the first (also referred to as primary) vacuum enclosure. This allows faster speeds using a motor of the same size and power. Note that the reduction in torque required is not due merely to the reduction in the vacuum force on the bellow. The vacuum force gives rise to an axial force between the nut and the screw thread of the shaft. This axial force causes significant friction between the nut and the screw. A reduction in the pressure differential, and hence in the vacuum force, results in a significant decrease in the amount of rotational friction between the nut and the screw thread. This reduced rotational friction also results in a significant decrease in the amount of torque required by the motor to drive the shaft.

The secondary vacuum enclosure does not need to be pumped down as much as the primary vacuum. Indeed the primary vacuum pressure must be many orders of magnitude less than the atmospheric pressure in order to perform adequately as a dielectric, whereas the pressure in the pre-vacuum enclosure may merely be one order of magnitude less than the atmospheric pressure, for example, which is already sufficient to reduce the axial force acting on the drive system (the screw/nut etc) by about a factor of 10. With the reduced force acting on the drive system, the required torque of the motor is reduced considerably which allows for higher speeds.

Moreover, the arrangement can increase the lifetime of the bellows, which separates two volumes under a reduced pressure differential and will therefore be subject to less membrane stress and less bending stress upon compression/expansion. The reduced vacuum force also leads to a reduction in the wear of the screw-and-nut drive system, thus leading to longer lifetimes of those components.

The fast vacuum variable capacitor described here may for example be configured with the motor located in the pre-vacuum enclosure, and with the gas in the pre-vacuum enclosure at a pressure of approximately 0.1 bar, for example. A pressure of 0.1 bar diminishes the vacuum force on the bellows by approximately 90% but still provides enough molecules to allow convection cooling so that the motor does not overheat. A better vacuum (a lower pressure) may not allow enough heat to be evacuated towards the outside environment leading to overheating of the motor and failure of the system. Generally, a pressure of between 0.05 bar and 0.5 bar has been found to offer a useful reduction in vacuum force, without the need for extra cooling measures. However, any pressure up to atmospheric pressure may be used, and still offer an improvement.

In principle, the vacuum force could be reduced to zero by fully evacuating the pre-vacuum chamber. This would reduce the required motor torque for driving the screw/nut to a very small value. However, the vacuum force provides a useful axial biasing force on the screw-nut drive. This axial biasing force significantly reduces the amount of play in the screw/nut drive, and thereby contributes to the accuracy (resolution) of the capacitor adjustment. The bellows may have an inherent spring-like force, which also has the effect of biasing the screw-nut mechanical interface. However, the bellows may be under compression at one point in its extension range, and in tension in another part of its extension range, so it will exert a positive and a negative biasing force on the drive screw/nut, depending on where in its extension range the bellows happens to be. Thus, it is advantageous to configure the pressure differential across the bellows such that the vacuum force is greater than the maximum bellows spring force acting in a direction opposite to the vacuum force. In other words, the resultant "vacuum force+bellows spring force" should not change orientation even when the bellows go through their neutral position (from being compressed to being extended). Indeed although the bellows force alone would change orientation depending whether it is operated in compression mode or in extension mode, the adding of the (diminished) vacuum force still ensures that the sum of the forces does not change orientation. This can be guaranteed by having the secondary vacuum pressure high enough to at least equalize the maximum amplitude of the bellows spring force of the capacitor. A change of orientation of the resultant force would allow backlash in the screw-nut system resulting in an inferior position control of the capacitor (and associated capacitance and impedance values). In other words, the diminished vacuum force should be determined so that it is still just big enough to compensate any bellows force in an opposite direction (this will depend on the mechanical properties of the bellows used).

For similar reasons, another advantage of a reduced but not fully compensated vacuum force, is that the capacitor can be positioned and integrated in any orientation into an impedance matching network provided that the reduced vacuum force still at least also compensates the gravitational force which applies on the movable electrode when the bellows axis is not horizontal. A pressure of 0.1 bar was found to be appropriate with typical choices of bellows and electrode mass. However, in other situations a higher or lower pressure may be more effective.

DETAILED DESCRIPTION OF THE INVENTION

The invention will now be described in detail, with reference to the accompanying drawings, in which.

The figures are provided for illustrative purposes only, and should not be construed as limiting the scope of the claimed patent protection.

Where the same references have been used in different drawings, they are intended to refer to similar or corresponding features. However, the use of different references does not necessarily indicate a difference between the features to which they refer.

DETAILED DESCRIPTION

Figure 1:
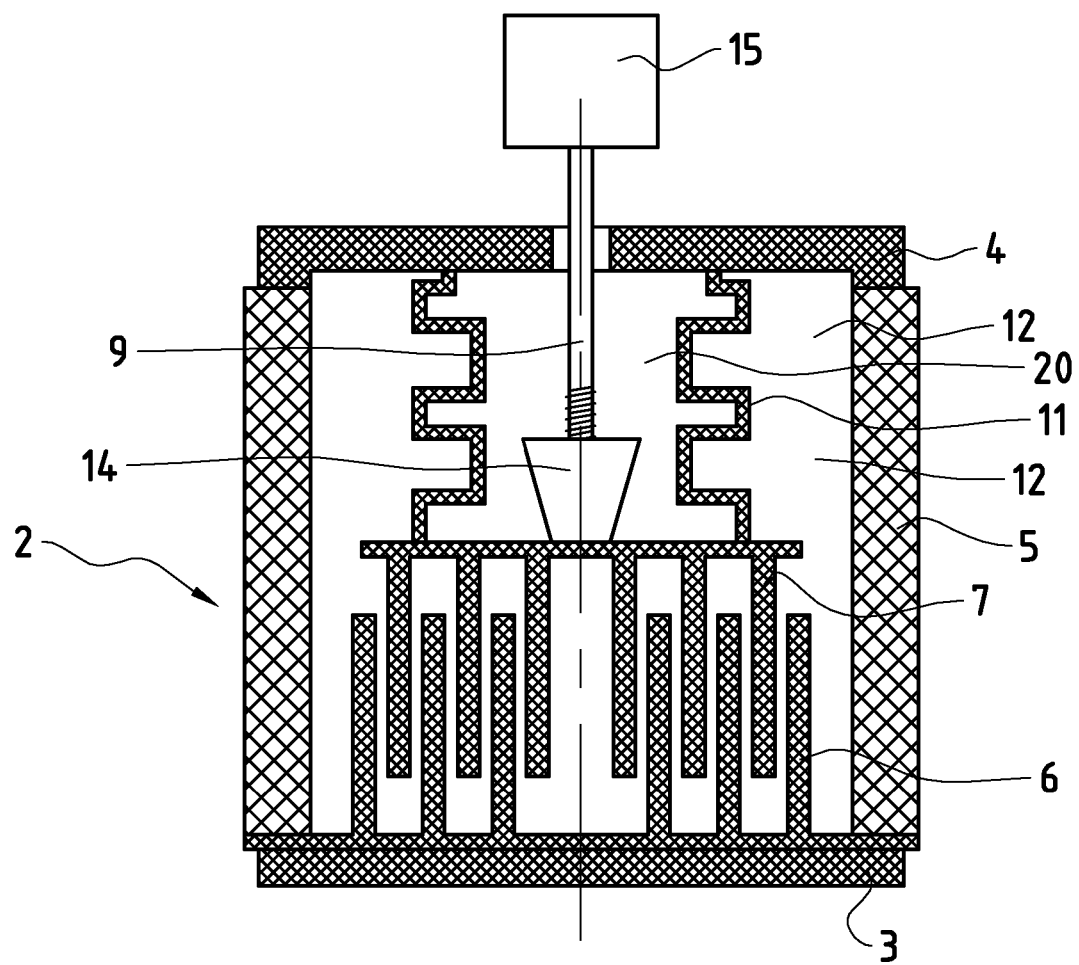
FIG. 1 shows, in schematic cross-sectional view, a prior art vacuum variable capacitor.

FIG. 1 shows a highly simplified, diagrammatical cross-section of an example of a prior art vacuum variable capacitor. It comprises a pumped and sealed vacuum enclosure (2) formed with two metallic collars (3, 4) electrically insulated from each other by a cylindrical ceramic piece (5) joined in a vacuum tight manner to the collars (3, 4). Inside the enclosure (2) and conductively attached to each metallic collar (3, 4) are a static electrode (6) and a movable electrode (7) whose function, together with the vacuum dielectric (12), is to generate electric capacitance. The static electrode (6) is mechanically fixed to one collar (3) and the movable electrode (7) can be moved by means of a drive system comprising a lead screw (9) and nut (14).

An expansion joint or bellows (11) separates the vacuum dielectric (12) from the atmospheric pressure outside the vacuum enclosure (2). Note that there is a force due to the pressure differential ($\Delta P \approx 1$ bar) that acts on the bellows (11) and the contact surface between the nut (14) and the lead screw (9). To change the capacitance value of the vacuum variable capacitor, the overlap of the electrodes (6) and (7) may be adjusted by turning the screw (9) an appropriate number of turns or fraction of turns. This is done by typically using a motor (15). The vacuum force, which can be as much as 300N or more, acts on the bellows (11) to pull the bellows and the nut towards the vacuum (ie downwards in FIG. 1). The magnitude of the vacuum force depends on the geometry of the bellows (11), which form the interface between the vacuum (12) and the surrounding atmosphere. This leads to a high torque requirement for the motor (15), which in turn limits its speed, as discussed above.

Figure 2:
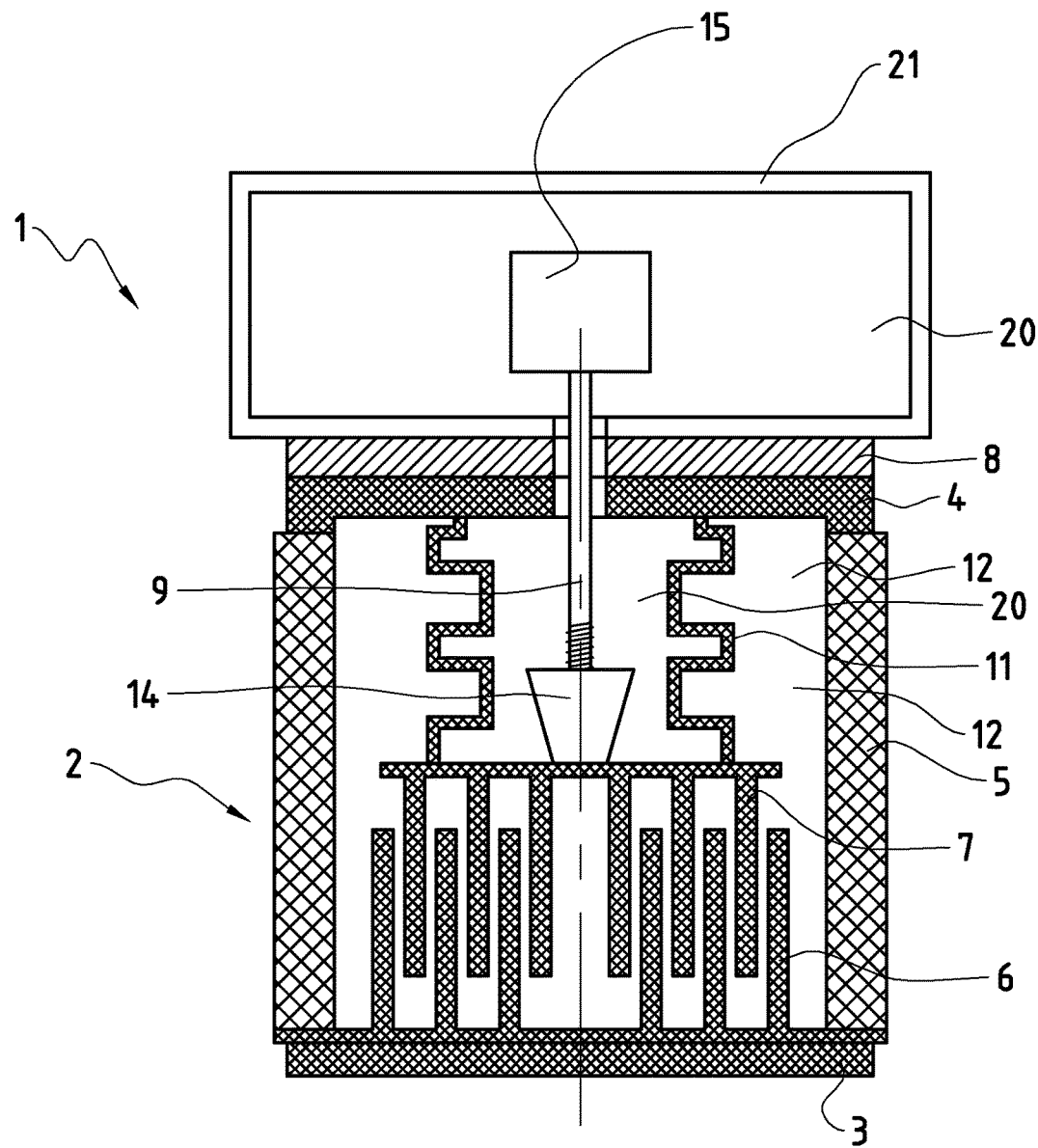
FIG. 2 shows, in schematic cross-sectional view, an example of a vacuum variable capacitor according to a first embodiment of the invention.

FIG. 2 shows, in similarly simplified form, an example of a vacuum variable capacitor (1) according to the present invention. It comprises a first vacuum-tight enclosure (2), electrodes (6, 7), motor (15), lead-screw (9), nut (14) and bellows (11) as already described in relation to FIG. 1. In addition, a low-pressure enclosure (21), also referred to as a partial vacuum or pre-vacuum enclosure, is sealed to the first vacuum enclosure (2). The pre-vacuum enclosure (21) contains a gas (20) at a pressure lower than atmospheric pressure, for example 0.1 bar.

Instead of separating the vacuum (12) from the atmosphere, as in FIG. 1, the bellows (11) of FIG. 2 now separate the vacuum (12) from a low-pressure gas (20) contained within the sealed pre-vacuum enclosure.

If the pressure in the pre-vacuum enclosure is 0.1 bar, then the vacuum force acting on the bellows (11) and the nut (14) will be approximately one tenth of the corresponding vacuum force in the vacuum variable capacitor illustrated in FIG. 1.

Because the vacuum force is reduced, the torque required by the motor (15) is also smaller than for the vacuum variable capacitor of FIG. 1. As a consequence, the same motor (15) as the one used in FIG. 1 can operate at higher speeds.

It can be noticed that in this embodiment, the motor (15), being in the pre-vacuum enclosure (21) is electrically insulated from the collar (4) which carries high electric power when the vacuum variable capacitor (i) is in RF operation. This is illustrated symbolically in FIG. 2 by an insulating material (8).

This collar (4) on the variable side of the vacuum variable capacitor (1) is often refered to as the "variable mounting plate" because it is used to mount the vacuum variable capacitor into an impedance matching network or other system. A different electrode arrangement inside the first vacuum tight enclosure (2) allows to simplify the mounting of the motor (15), as will be explained in relation to the second embodiment of the invention.

Coming back to the present embodiment (FIG. 2), let us assume that the pressure in the pre-vacuum enclosure (21) is 0.1 bar for the following discussion about the increase of the lifetime of the vacuum variable capacitor.

Firstly, the bellows (11) lifetime improves because the pressure differential ($\Delta P$) across the bellows (11) is now reduced by 90%, and this reduction will produce lower membrane stress and lower bending stress of the bellows (11) in extension or compression, thus leading to an extended lifetime. Secondly, the lifetime of the screw (9) and nut (14) is also improved, because the PV value is reduced thanks to the lower pressure value. PV is the product of pressure and velocity, where the pressure and velocity here are those at the contact surfaces of the mating threads of the screw (9) and nut (14). The PV value is a common engineering value that may be used to predict mechanical wear and the time to failure of two sliding surfaces in contact such as those of screws and nuts. A decreased pressure difference across the bellows (11) results in a lower contact pressure between the mating thread surfaces of the screw (9) and the nut (14). With the vacuum variable capacitor (1) illustrated in FIG. 2, the reduction in contact pressure between screw (9) and nut (14) gives rise to one or more of the following beneficial properties:

For a given screw/nut pairing, less wear and longer lifetimes;

For a given screw/nut system and the same lifetime requirements, it allows the screw/nut drive system to operate at faster speeds without reducing lifetime;

Choosing a less expensive combination of screw/nut materials and still reaching the same lifetimes at the same speeds;

Choosing smaller screws and nuts (and therefore contributing to the miniaturization of the vacuum capacitor) without reducing lifetime.

The motor (15) may be a stepper motor, for example. Alternatively, one may use other types of DC motors or AC servo motors. It is also possible to use linear motors without any rotating part in the drive, thereby achieving even higher speeds with a given size motor.

Figure 3:
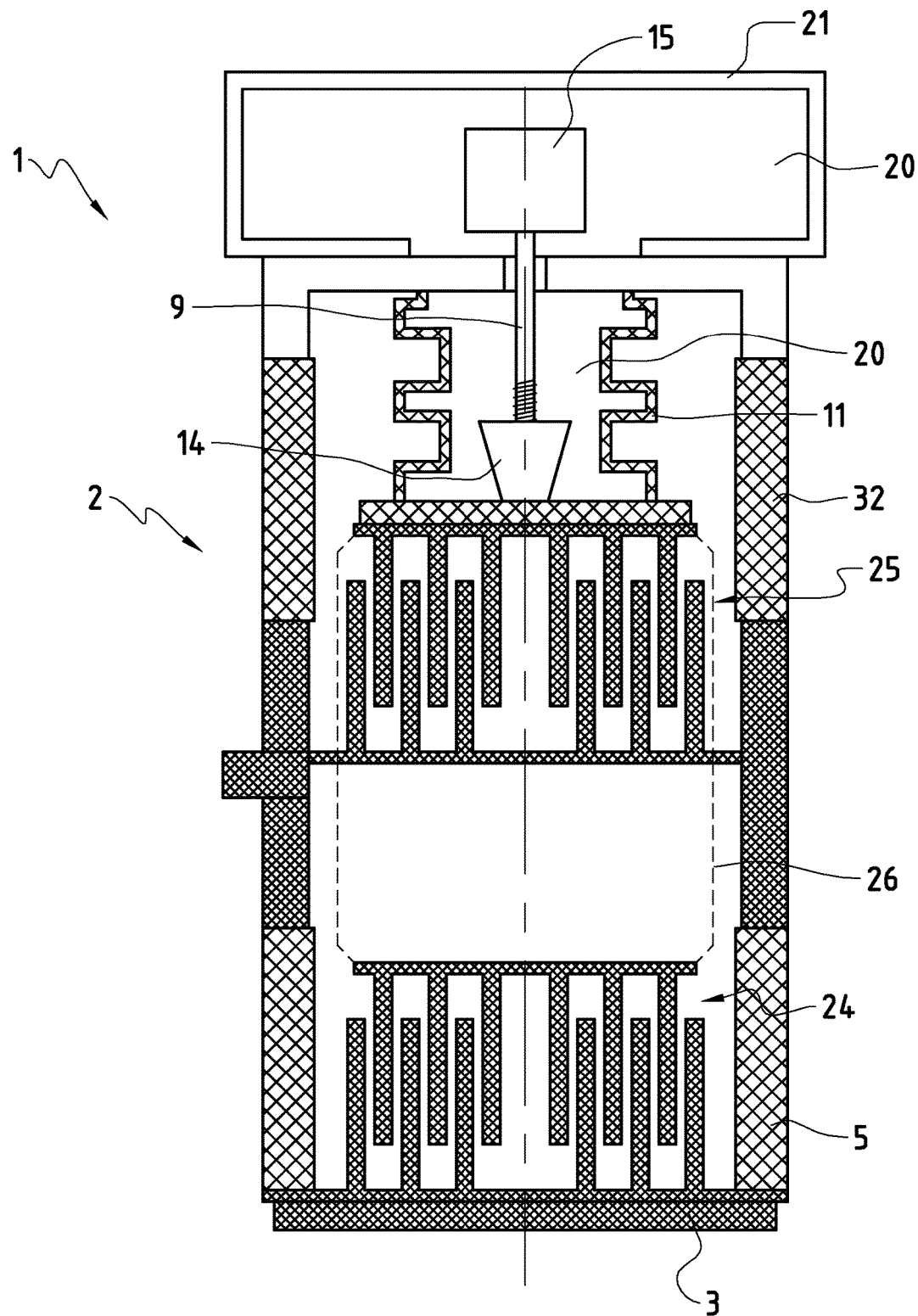
FIG. 3 shows, in schematic cross-sectional view, an example of a vacuum variable capacitor according to a second embodiment of the invention.

FIG. 3 shows an example of a vacuum variable capacitor according to a second embodiment of the present invention. In this example, the arrangement of two ganged sets of electrodes (24, 25) inside the first vacuum enclosure (2) and the use of a second ceramic insulator (32) as part of the vacuum enclosure (2) makes it possible to connect the motor (15), located in the pre-vacuum enclosure (21) such that the pre-vacuum enclosure does not require an extra insulating piece to electrically insulate the motor from the high voltages applied during operations of the vacuum variable capacitor (1). This allows a more compact layout of the motor in the second vacuum enclosure.

In both FIGS. 2 and 3, the motor (15) has been shown as being located inside the pre-vacuum enclosure (21). However, the motor (15) may alternatively be arranged wholly or partially outside the pre-vacuum enclosure (21). The pre-vacuum enclosure (21) serves as a pressure vessel, for reducing the pressure differential across the bellows (11), and its use for housing the motor (15) is secondary.

Figure 4:
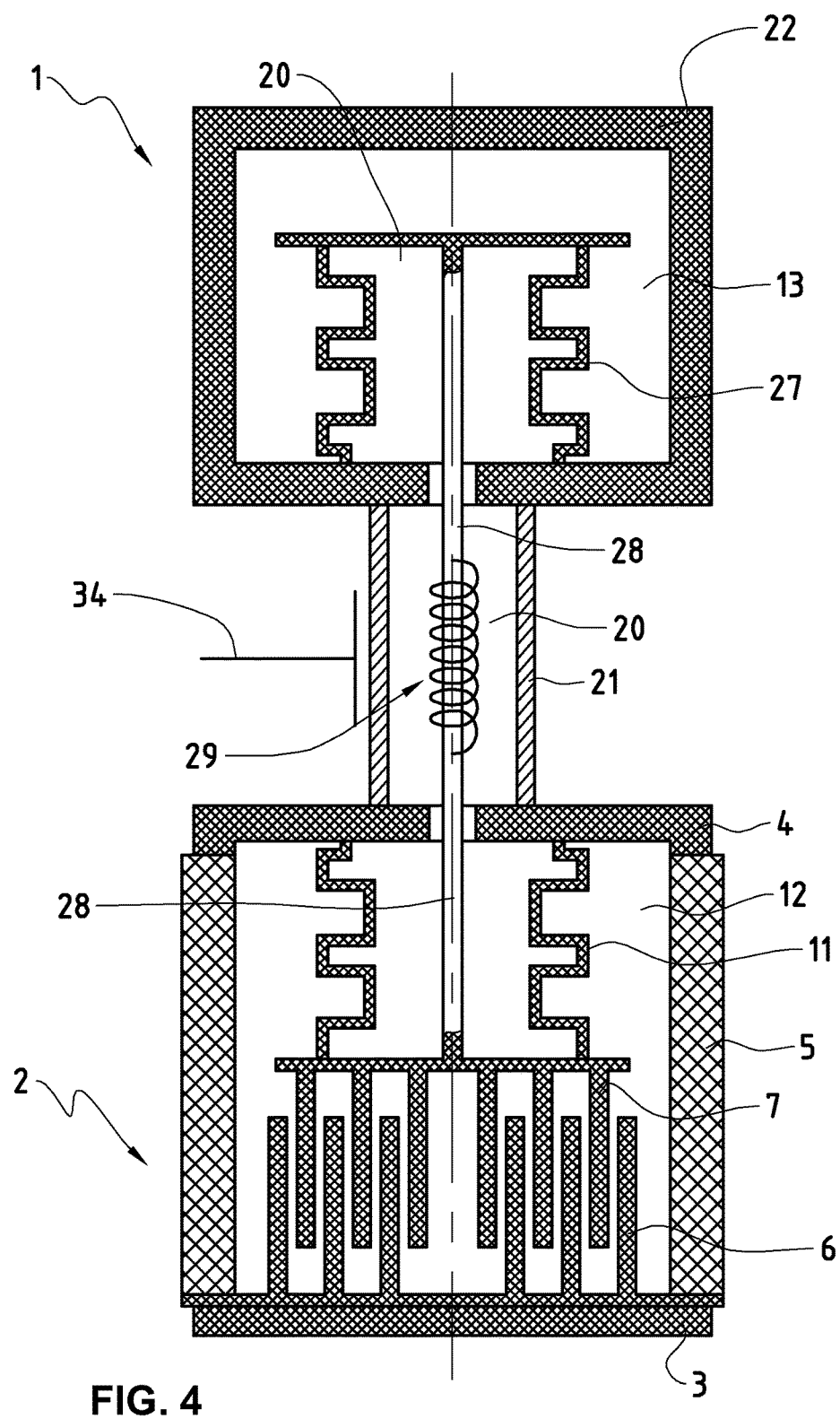
FIG. 4 shows, in schematic cross-sectional view, an example of a vacuum variable capacitor according to a third embodiment of the present invention.

FIG. 4 shows an example of a vacuum variable capacitor (1) according to a third embodiment of the present invention, which comprises, as in the first and second embodiments, a first vacuum enclosure (2) containing electrodes (6, 7) in a vacuum (12), and bellows (11), which separate the vacuum (12) from a pre-vacuum enclosure (21) containing a gas (20) at low pressure, as described in relation to the first and second embodiments.

The vacuum variable capacitor of FIG. 4 also comprises a second vacuum enclosure (22) and second deformable wall region, or bellows (27), and a pre-vacuum enclosure (21), which are constructed such that the net vacuum force of the second bellows (27) due to the pressure differential between the second vacuum (13) and the pre-vacuum gas (20), and the bellows spring force of the second bellows (27), are substantially the same as, but acting in the opposite direction to, the corresponding net vacuum force and bellows spring force on the first bellows (11).

As shown in FIG. 4, the first and second bellows are connected by a mechanical linking means (in this case a common shaft, 9), which ensures that a movement of the first bellows (11) is countered by a similar, but opposite movement of the second bellows (27), and vice versa. In other words, if the first bellows (11) moves against its vacuum force (upwards in the FIG. 4), the second bellows (27) moves with its vacuum force (also upwards in the FIG. 4).

In this way, the vacuum and spring force on the bellows (11) can be substantially (or even completely) compensated by the second, similar (but counteracting) bellows (27) and vacuum enclosure (22) arrangement.

Various possible mechanical linkages can be envisaged for linking the two bellows (11 and 27), but a straight-through shaft (28), fixed at either end to the respective end portions of the first (11) and second (27) bellows has the advantage that it requires no threaded joint or other moving parts.

FIG. 4 shows an arrangement in which the first (2) and second (22) vacuum enclosures share a common pre-vacuum enclosure (21) for reducing the pressure differential across the respective bellows (11, 27). However, it would be possible to use two separate pre-vacuum enclosures to achieve the same result.

With this arrangement, it is particularly advantageous to use a linear drive or any other moving means which do not contain a screw and nut. Furthermore with this embodiment, the force necessary to adjust the vacuum variable capacitor is reduced even more than in the previously discussed embodiments, and even higher speeds can be achieved. A linear motor (29, 34), such as a linear induction or voice-coil type motor can for example be used to adjust the vacuum variable capacitor of FIG. 4. Furthermore, because the nett vacuum and spring forces on the bellows are effectively reduced to zero, the capacitance adjustment speed does not depend on the pressure in the pre-vacuum enclosure (21). The pressure in the pre-vacuum enclosure (21) could thus be any value, including atmospheric pressure, or a higher-than-atmospheric pressure. Indeed, the vacuum variable capacitor of the third embodiment may dispense with the pre-vacuum enclosure (21) altogether. The vacuum/spring forces transmitted by the bellows (11, 27) to the mechanical linkage (28) would still be cancelled out.

Note that it would be possible in all three embodiments of the invention to locate the motor (15) or voice coil (29) in the vacuum (12) inside the first vacuum enclosure (2), or, in the third embodiment, in the vacuum (13) inside the second vacuum enclosure (22). However, while some motors are known to work in outer space and are therefore vacuum compatible, it is not feasible to integrate directly an electric motor into the vacuum enclosure containing the electrodes. The reason is that even such motors outgas and degrade the vacuum required for dielectric purposes: vacuum pressures better (lower) than 10-3 mbar are necessary to be maintained, but those were found to be incompatible with long term outgassing rates of motor parts.

The invention claimed is:

1. A vacuum variable capacitor adjustable between a minimum capacitance value and a maximum capacitance value, the vacuum variable capacitor comprising:
   a first vacuum enclosure containing capacitor electrodes separated by a vacuum dielectric, the wall of the first vacuum enclosure comprising a first deformable region, hereafter referred to as first bellows, for transferring mechanical movement between a drive means disposed outside the first vacuum enclosure and a mobile one of the capacitor electrodes inside the first vacuum enclosure, and
   a second enclosure, referred to hereafter as the pre-vacuum enclosure, containing a gas at a predetermined pressure, lower than atmospheric pressure, the pre-vacuum enclosure being arranged such that the first bellows separates the gas in the pre-vacuum enclosure from the vacuum dielectric in the first vacuum enclosure,
   wherein the drive means, the electrodes, and the predetermined pressure in the pre-vacuum enclosure are configured so that the minimum adjustment time between the minimum capacitance value and the maximum capacitance value is less than 0.1s.

2. A vacuum variable capacitor according to claim 1, wherein the drive means comprises a motor disposed within the pre-vacuum enclosure.

3. A vacuum variable capacitor according to claim 1, wherein the drive means comprises a DC motor, an AC servo motor or a linear motor.

4. A vacuum variable capacitor according to claim 1, wherein the maximum capacitance value is at least 10 times greater than the minimum capacitance value.

5. A vacuum variable capacitor according to claim 1, wherein the bellows is configured to sustain 10 million cycles, where one cycle comprises a first capacitance adjustment from a first capacitance value to a second capacitance value, where the second capacitance value is ten times the first capacitance value, and a second capacitance adjustment from the second capacitance value to the first capacitance value.

6. A vacuum variable capacitor according to claim 5, wherein the motor, the electrodes and the drive means are configured so that the minimum adjustment time for one of said cycles is less than 0.05s.

7. A vacuum variable capacitor according to claim 1, comprising control means for controlling the motor, wherein the control means, the motor, and the drive means are configured such that the capacitance is adjustable in increments smaller than 1/5000th of the difference between the maximum and the minimum capacitance values.

8. A vacuum variable capacitor according to claim 1, comprising an insulation element for electrically insulating the drive means from a variable mounting plate of the first vacuum enclosure.

9. A vacuum variable capacitor according to claim 8, wherein the first vacuum enclosure comprises two or more sets of ganged electrodes arranged such that the vacuum variable capacitor is operable without high voltage between the variable mounting plate and the drive measn.

10. A vacuum variable capacitor according to claim 1, comprising a second vacuum enclosure comprising a second deformable wall region, referred to hereafter as second bellows, separating the second vacuum enclosure from the pre-vacuum enclosure, wherein the first bellows is mechanically linked to the second bellows.

11. A vacuum variable capacitor according to, claim 10, wherein the second bellows is substantially identical to the first bellows.

12. A vacuum variable capacitor according to claim 1, wherein the drive means comprise a voice coil or other linear drive.

13. A vacuum variable capacitor according to claim 2, wherein the drive means are configured such that a motor force supplied by the motor and transmitted to the mobile electrode is not transmitted through a threaded connection.

14. A vacuum variable capacitor according to claim 2, wherein the drive means comprise a lead screw and a nut, and wherein the screw and/or the nut comprise a ceramic material.

* * * * *